(12) United States Patent
Manku et al.

(10) Patent No.: US 9,143,968 B1
(45) Date of Patent: Sep. 22, 2015

(54) WIRELESS SPECTRUM MONITORING AND ANALYSIS

(71) Applicant: Cognitive Systems Corp., Waterloo (CA)

(72) Inventors: Tajinder Manku, Waterloo (CA); Oleksiy Kravets, Petersburg (CA)

(73) Assignee: Cognitive Systems Corp., Waterloo, ON (CA)

( * ) Notice: Subject to any disclaimer, the term of this patent is extended or adjusted under 35 U.S.C. 154(b) by 0 days.

(21) Appl. No.: 14/334,822

(22) Filed: Jul. 18, 2014

(51) Int. Cl.
   *G01R 31/08* (2006.01)
   *H04W 24/08* (2009.01)
   *H04W 24/02* (2009.01)
   *H04W 4/00* (2009.01)

(52) U.S. Cl.
   CPC ............ *H04W 24/08* (2013.01); *H04W 4/00* (2013.01); *H04W 24/02* (2013.01)

(58) Field of Classification Search
   CPC ....................................................... H04W 4/00
   USPC .......... 370/236, 328–339, 312, 386; 455/450, 455/452, 501–522
   See application file for complete search history.

(56) References Cited

U.S. PATENT DOCUMENTS

| | | | |
|---|---|---|---|
| 6,046,682 A | 4/2000 | Zimmerman et al. | |
| 6,816,709 B2 | 11/2004 | Dickey | |
| 6,917,609 B2 | 7/2005 | Dickey | |
| 6,931,235 B2 | 8/2005 | Kline et al. | |
| 6,950,665 B2 | 9/2005 | Swift et al. | |
| 7,013,113 B2 | 3/2006 | Dickey | |
| 7,019,691 B1 | 3/2006 | Soltanian et al. | |
| 7,050,755 B2 | 5/2006 | Kline | |
| 7,180,420 B2 | 2/2007 | Maurer | |
| 7,236,746 B2 | 6/2007 | Peric | |
| 7,272,126 B2 | 9/2007 | Soltanian et al. | |

(Continued)

FOREIGN PATENT DOCUMENTS

| CA | 2192248 | 6/1997 |
|---|---|---|
| EP | 0863638 | 9/1998 |
| WO | 2010/083606 | 7/2010 |

OTHER PUBLICATIONS

SeeGull® EXflex™ Scanning Receiver, PCTEL® RF Solutions, Obtained online at http://rfsolutions.pctel.com/artifacts/10MRK2_11_SeeGull_EXflex_Brochure.pdf on Jul. 17, 2014, 4 pages.

(Continued)

*Primary Examiner* — Iqbal Zaidi
(74) *Attorney, Agent, or Firm* — Michael K. Henry; Henry Patent Law Firm, PLLC

(57) ABSTRACT

In some aspects, a wireless-spectrum analysis system is described. In some examples, the wireless-spectrum analysis system includes wireless-spectrum analysis devices distributed at distinct locations over a geographic region. The wireless-spectrum analysis devices are configured to concurrently monitor wireless-spectrum usage at each distinct location. Each wireless-spectrum analysis device is configured to transmit, from the wireless-spectrum analysis device, spectral-usage parameters identified by the wireless-spectrum analysis device based on wireless signals detected by the wireless-spectrum analysis device at its distinct location. The wireless-spectrum analysis system further includes a data aggregation system configured to aggregate the spectral-usage parameters transmitted from the wireless-spectrum analysis devices.

22 Claims, 10 Drawing Sheets

(56) References Cited

U.S. PATENT DOCUMENTS

| | | |
|---|---|---|
| 7,295,156 B2 | 11/2007 | Van Wyck Loomis |
| 7,460,837 B2 | 12/2008 | Diener |
| 7,466,986 B2 | 12/2008 | Halcrow et al. |
| 7,610,036 B2 | 10/2009 | Teo et al. |
| 7,639,985 B2 | 12/2009 | Dickey |
| 8,422,461 B2 | 4/2013 | Dickey |
| 8,576,825 B2 | 11/2013 | Wu et al. |
| 2003/0139909 A1 | 7/2003 | Ozawa |
| 2004/0152471 A1 | 8/2004 | MacDonald et al. |
| 2004/0233928 A1* | 11/2004 | Pozsgay ................ 370/446 |
| 2005/0108129 A1 | 5/2005 | Seibert et al. |
| 2005/0286409 A1 | 12/2005 | Yoon et al. |
| 2006/0083205 A1* | 4/2006 | Buddhikot et al. .......... 370/338 |
| 2006/0246911 A1 | 11/2006 | Petermann |
| 2007/0039035 A1* | 2/2007 | Magin .................... 725/127 |
| 2008/0076450 A1 | 3/2008 | Nanda et al. |
| 2008/0125108 A1 | 5/2008 | Kuo et al. |
| 2008/0166974 A1 | 7/2008 | Teo et al. |
| 2008/0231499 A1 | 9/2008 | Kim et al. |
| 2008/0266050 A1 | 10/2008 | Crouse et al. |
| 2009/0197550 A1 | 8/2009 | Huttunen et al. |
| 2009/0201208 A1 | 8/2009 | McPherson et al. |
| 2010/0135263 A1 | 6/2010 | Zakrzewski |
| 2010/0203837 A1 | 8/2010 | Taniguchi |
| 2010/0246416 A1 | 9/2010 | Sinha et al. |
| 2011/0085524 A1* | 4/2011 | Soliman et al. ............ 370/338 |
| 2011/0166897 A1 | 7/2011 | Beckman |
| 2011/0185059 A1 | 7/2011 | Adnani et al. |
| 2011/0210843 A1 | 9/2011 | Kummetz |
| 2011/0285589 A1 | 11/2011 | Bull |
| 2012/0238218 A1 | 9/2012 | Stine |
| 2013/0029589 A1 | 1/2013 | Bontu et al. |
| 2013/0072226 A1 | 3/2013 | Thramann |
| 2013/0150074 A1 | 6/2013 | Shrestha et al. |
| 2013/0310093 A1 | 11/2013 | Giannakis et al. |
| 2014/0063055 A1 | 3/2014 | Osterhout et al. |
| 2014/0162702 A1 | 6/2014 | Crawford et al. |
| 2014/0168225 A1 | 6/2014 | Ohwaki et al. |
| 2014/0274109 A1 | 9/2014 | Venkatraman et al. |
| 2015/0119014 A1 | 4/2015 | Muraoka et al. |

OTHER PUBLICATIONS

EXflex™ Pay Per Use Metered Licensing System, Feature Highlight, Obtained online at http://rfsolutions.pctel.com/artifacts/Pctel_PPU_FINAL.PDF on Jul. 17, 2014, 1 page.

PCTEL, SeeGull® Scann Receivers, High Performance Wireless Network Measurement, Obtained online at http://rfsolutions.pctel.com/content.cgi?id_num=683 on Jul. 17, 2014, 8 pages.

Baldock radio monitoring station, obtained online at http://stakeholders.ofcom.org.uk/binaries/enforcement/spectrum-enforcement/baldock.pdf, on Jul. 17, 2014, 13 pages.

Buddhikot et al. DIMSUMNet: New Directions in Wireless Networking Using Coordinated Dynamic Spectrum Access, Proceedings of the Sixth IEEE International Symposium on (WoWMoM '05), 2005 IEEE; 8 pages.

Office action issued in U.S. Appl. No. 14/521,173 on Dec. 10, 2014, 15 pages.

International Search Report and Written Opinion issued in application PCT/CA2014/000602 on Mar. 20, 2015, 10 pages.

Office action in U.S. Appl. No. 14/613,912 issued on May 19, 2015, 18 pages.

Non-Final Office Action received in U.S. Appl. No. 14/668,549, Jun. 10, 2015, 11 pages.

Non-Final Office Action received in U.S. Appl. No. 14/730,688, Jul. 17, 2015, 20 pages.

PCT International Search Report and Written Opinion of the International Searching Authority, PCT/CA2014/000826, Jul. 16, 2015, 8 pages.

* cited by examiner

WIRELESS SPECTRUM MONITORING AND ANALYSIS

BACKGROUND

This specification relates to wireless-spectrum monitoring and analysis.

Radio frequency (RF) spectrum is a limited and valuable resource. Governmental agencies and regulatory authorities typically control allocation and use of the spectrum, and the rights to use portions of the spectrum are sold or licensed to wireless service providers and other types of public and private entities. The wireless service providers use the spectrum allocated to them to provide wireless services to end users, for example, in the frequency bands for wireless communication standards.

SUMMARY

In a general aspect, wireless-spectrum usage is monitored and analyzed.

In some aspects, a wireless-spectrum analysis system includes wireless-spectrum analysis devices distributed at distinct locations over a geographic region. The wireless-spectrum analysis devices are configured to concurrently monitor wireless-spectrum usage at each distinct location. Each wireless-spectrum analysis device is configured to transmit, from the wireless-spectrum analysis device, spectral-usage parameters identified by the wireless-spectrum analysis device based on wireless signals detected by the wireless-spectrum analysis device at its distinct location. The wireless-spectrum analysis system further includes a data aggregation system configured to aggregate the spectral-usage parameters transmitted from the wireless-spectrum analysis devices.

In some aspects, a wireless-spectrum analysis system includes a communication system and a data analysis system. The communication system is configured to receive spectral-usage parameters from wireless-spectrum analysis devices distributed over a geographic region. The spectral-usage parameters are based on wireless signals detected by the wireless-spectrum analysis devices at their respective locations in the geographic region. The data analysis system generates a spectral-usage report for the geographic region based on the spectral-usage parameters from the devices.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
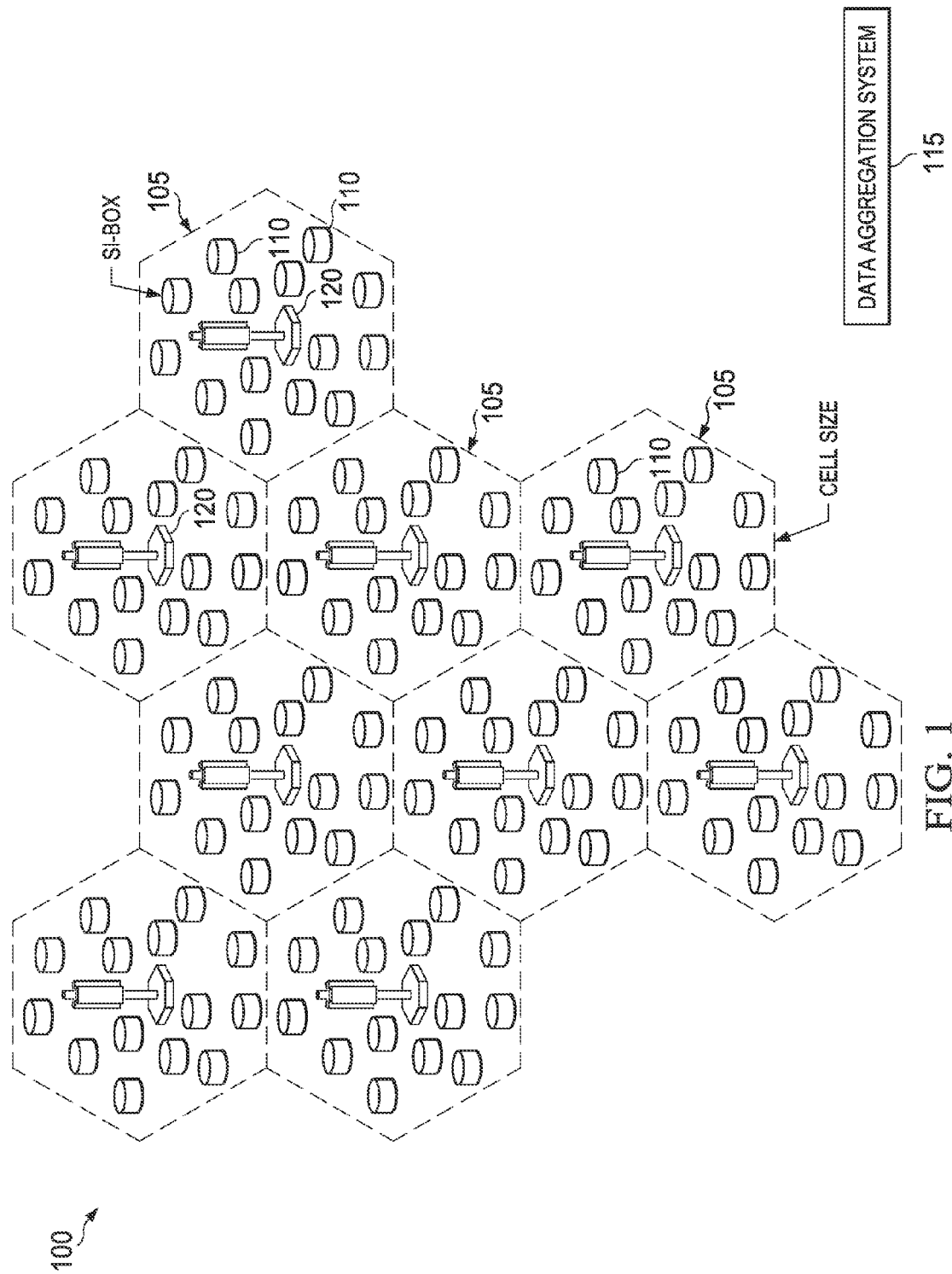
FIG. 1 is a block diagram showing an example wireless-spectrum analysis system.

In some aspects of what is described here, wireless-spectrum usage is monitored and analyzed over space and time. For example, spectral-usage parameters can be aggregated from a number of wireless-spectrum analysis devices that operate concurrently at various locations in a geographic region. The geographic region can be relatively small or large (e.g., having a radius ranging from tens or hundreds of meters to multiple-kilometers) and can generally represent any area of interest (e.g., a building, city block, jurisdiction, demographic, industry, etc.). In some instances, the aggregated data can facilitate a realistic and comprehensive analysis of spectral usage and provide an understanding of the utilization and quality of wireless-spectrum and other resources in the geographic region.

In some implementations, wireless-spectrum usage for various wireless communication standards is monitored and analyzed. For example, the wireless-spectrum analysis devices can monitor and analyze 2G standards such as Global System for Mobile (GSM) and Enhanced Data rates for GSM Evolution (EDGE) or EGPRS, 3G standards such as Code division multiple access (CDMA), Universal Mobile Telecommunications System (UMTS), and Time Division Synchronous Code Division Multiple Access (TD-SCDMA), 4G standards such as Long-Term Evolution (LTE) and LTE-Advanced (LTE-A), wireless local area network (WLAN) or WiFi standards such as IEEE 802.11, Bluetooth, near-field communications (NFC), millimeter communications, or multiple of these or other types of wireless communication standards. In some implementations, wireless-spectrum usage for other types of wireless communication (e.g., non-standardized signals and communication protocols) is monitored and analyzed.

In some instances, wireless-spectrum usage data and related information can be collected by or provided to (e.g., sold, subscribed, shared, or otherwise provided to) various entities. For example, wireless-spectrum usage data can be used by governmental agencies or regulatory authorities (e.g., Federal Communications Commission (FCC), etc.), standards-development organizations (e.g., 3rd Generation Partnership Project (3GPP), the Institute of Electrical and Electronics Engineers (IEEE), etc.), spectrum rights owners and licensees, wireless service providers, wireless device and chip manufactures and vendors, end users of the wireless services, or other entities.

The wireless-spectrum usage data and related information can be used for a variety of purposes. For example, governmental agencies or regulatory authorities may use the information to better regulate, control, and enforce allocated or unallocated spectrum usage rights, standards-development organizations may use the information to choose operating frequencies and develop standards to balance spectrum load (e.g., by exploiting under-loaded frequency bands and off-loading congested frequency bands), or service providers may use the information to optimize or otherwise improve system hardware, software, services, or infrastructure.

With more accurate and more comprehensive spectrum usage data, targeted schemes can be designed to improve the utilization of wireless-spectrum and other resources. In some instances, based on utilization and quality of the frequency bands that they own or operate on, spectrum rights owners and licensees or wireless service providers can design, modify, or otherwise manage their own spectrum usage. For example, given the knowledge that certain geographic locations experience heavy data traffic, wireless service providers may add base stations or modify a cell configuration (e.g., adjusting a frequency reuse scheme) to accommodate the heavy data traffic in the geographic locations. As another example, given the knowledge that certain times of day experience heavier data traffic than others, wireless service providers may design promotions or policies to encourage usage during other than peak hours.

In some examples, a wireless-spectrum analysis system includes a number of wireless-spectrum analysis devices (e.g., spectrum inspection (SI) boxes) and a data aggregation system. The wireless-spectrum analysis devices can be distributed over various locations over a geographic region. The wireless-spectrum analysis devices can monitor and analyze the RF spectrum at the respective locations, and transmit spectral-usage parameters to the data aggregation system. The data aggregation system can serve as a central back-end system that aggregates, compiles, and analyzes information transmitted from the wireless-spectrum analysis devices.

In some implementations, the wireless-spectrum analysis system and the individual the wireless-spectrum analysis devices can perform various types of analysis in the frequency domain, the time domain, or both. For example, analyzing wireless-spectrum usage may include analyzing the wireless spectrum in a frequency domain, analyzing wireless signals in the time domain, or a combination of these and other types of analysis. In some cases, the wireless-spectrum analysis devices are configured to determine bandwidth, power spectral density, or other frequency attributes based on detected signals. In some cases, the wireless-spectrum analysis devices are configured to perform demodulation and other operations to extract content from the wireless signals in the time domain such as, for example, signaling information included the wireless signals (e.g., preambles, synchronization information, channel condition indicator, SSID/MAC address of a WiFi network).

In some examples, a wireless-spectrum analysis system provides a spectral-usage report based on spectral-usage data from the devices. The spectral-usage report can be provided to users (e.g., in a user-interface), stored in a database (e.g., for analysis or archival purposes), transmitted to subscribers or other entities (e.g., governmental agencies or regulatory authorities, standards-development organizations, spectrum rights owners and licensees, wireless service providers, etc.), or output in another manner. In some instances, a spectral-usage report can include text, data, tables, charts, graphs or other representations of wireless-spectrum usage.

In some examples, the spectral-usage report can include frequency-domain information, time-domain information, spatial-domain information, or a combination of these and other knowledge gained from analyzing the wireless signals detected by the wireless-spectrum analysis devices. The spectral-usage report can include global information and higher-level knowledge based on the data from all multiple wireless-spectrum analysis devices in disparate locations. For instance, the spectral-usage report can include trends, statistics, patterns, coverage, network performance, or other information over time or space. In some implementations, the spectral-usage report can be tailored or customized based on the business, preferences, or other attributes of a particular user or entity.

In some examples, a large number of wireless-spectrum analysis devices can be used at distinct locations over a geographic region to concurrently monitor wireless-spectrum usage at each distinct location. Accordingly, RF signals at various locations can be inspected at the same time or during overlapping time periods, which may render a more accurate and more comprehensive inspection of the spectrum usage over the geographic region. In some cases, a wireless-spectrum analysis device monitors wireless-spectrum usage at its respective location by "listening" or "watching" for RF signals over a broad range of frequencies and processing the RF signals that it detects. There may be times when no RF signals are detected, and a wireless-spectrum analysis device may process RF signals (e.g., from time to time or continuously) as they are detected in the local environment of the device.

In many instances, the wireless-spectrum analysis devices can detect wireless signals that have been transmitted by or between other entities or systems, for example, on a particular frequency or set of frequencies, or by natural phenomena. The source, destination, context, and nature of the wireless signals can vary. Accordingly, the wireless-spectrum analysis devices may monitor wireless-spectrum usage by a variety of systems, entities, or phenomena, and the systems described here are not limited to monitoring any particular type or class of systems or protocols.

In some cases, the wireless-spectrum analysis devices can be implemented as relatively low-cost, compact, and lightweight devices. The small size and portability can, in some instances, expand the applicability and enhance the flexibility of the wireless-spectrum analysis system. In some instances, wireless-spectrum analysis devices can be placed at or coupled to a pico/femto cell box of a cellular system, a WiFi access point or base station, a vehicle, a router, a mobile device (e.g., a smartphone, a tablet, etc.), a computer, an Internet of Things (e.g., machine to machine (M2M)) module, a cable modem box, a home gear electronic box (e.g., TV, modem, DVD, video game stations, laptops, kitchen gear, printers, lighting, phones, clocks, thermostats, fire detection units, $CO_2$ detection units, etc.), or other places.

In some implementations, a wireless-spectrum analysis device can perform computations and analyses on the raw data (e.g., the detected RF signals) on the spot, to extract a digest of relevant information (e.g., spectral-usage parameters). In some implementations, instead of transmitting the raw data to the data aggregation system, the wireless-spectrum analysis devices transmit the digest extracted from the raw data, which may reduce data traffic, reduce power consumption (which may extend battery life, where applicable), and provide other advantages. In some cases, the raw data can be transmitted to the data aggregation system, for example, upon request or in other instances.

In some implementations, communication between wireless-spectrum analysis devices and a data aggregation system can be based on, for example, internet protocol (IP) transport or another standard data transport protocol, which may provide more efficient data transmission. In general, messages can be transmitted from the wireless-spectrum analysis devices to the data aggregation system at any time. For example, the transmission can be triggered by detected usage of the RF spectrum, initiated by a request from the data aggregation system, sent according to a predetermined schedule or periodic intervals, or otherwise. In some instances, the aggregation system can request data from a particular wireless-spectrum analysis device.

In some examples, the wireless-spectrum analysis devices can be deployed and controlled from a back-end system. For example, the wireless-spectrum analysis devices may operate without requiring a technician on site to operate the device. In some implementations, a data aggregation system or another type of central control system can execute control operations, for example, to configure or upgrade the wireless-spectrum analysis devices. In some instances, the control system can request configure information or run internal tests on any particular wireless-spectrum analysis device.

FIG. 1 is a block diagram showing an example wireless-spectrum analysis system 100. The example wireless-spectrum analysis system 100 shown in FIG. 1 includes a network of wireless-spectrum analysis devices 110 (denoted as SI boxes) and a data aggregation system 115. As shown in FIG. 1, a number (e.g., tens, hundreds or thousands) of wireless-spectrum analysis devices 110 can be distributed over a geographic area encompassing multiple cells 105 of one or more cellular networks, with multiple wireless-spectrum analysis devices 110 in each cell 105. In some implementations, the wireless-spectrum analysis devices 110 can be distributed over another geographic region, for example, an area that does not include a cellular network. The wireless-spectrum analysis devices 110 can be identical or similar to each other; or the wireless-spectrum analysis system 100 can include a variety of different wireless-spectrum analysis devices 110.

As shown in FIG. 1, each cell 105 includes one or more base stations 120, which interface with user equipment (e.g., cellular phones, etc.) in a cellular network (e.g., a cellular voice network, cellular data network, etc.). Each cell 105 typically includes a single base station 120. Typically, the density of the base stations in a geographic region is determined based on a desired cell coverage and is computed during a cell planning stage and thus remains relatively fixed once the infrastructure has been deployed.

A base station 120 typically provides wireless service for mobile devices in a broad region, for example, over an entire cell 105. As such, the base stations 120 need enough power to transmit signals over a relatively large region, for example, to provide satisfactory cell coverage. Base stations typically use an array of high power processors or high power components with power consumption on the order of 10 Watts to 100 Watts or more, and may require cooling systems to maintain an operating temperature of the base station. For these and other reasons, base stations are often large, expensive systems. For example, a cellular base station is often composed of several antennas mounted on a tower and a building with electronics near the base of the tower, and a cellular base station can cost in the range of $100,000 to $1,000,000 or more, in some instances.

In the example shown, the wireless-spectrum analysis devices 110 provide spectral usage information to the data aggregation system 115. For example, the wireless-spectrum analysis devices 110 may send messages (e.g., IP packets, Ethernet frames, etc.) to the data aggregation system 115 through an IP cloud network, an Ethernet, or another communication system. For instance, the wireless-spectrum analysis system 100 may leverage existing communication and power infrastructure (e.g., public networks, private networks, wide area networks, etc.), other than (or including) the cellular networks supported by the base stations 120.

The example wireless-spectrum analysis devices 110 can be modular or standalone devices that that each monitor and analyze wireless signals in a local area. In some cases, the wireless-spectrum analysis devices 110 are dedicated to providing spectral usage data, without providing cellular service (e.g., to user equipment), supporting operation of the base stations 120, or otherwise operating as a component of the cellular network. For example, the wireless-spectrum analysis devices 110 can include specialized hardware (e.g., customized circuits, customized chipsets, etc.) and specialized software (e.g., signal processing and analysis algorithms) for detecting and analyzing wireless signals.

In some instances, the wireless-spectrum analysis devices 110 operate with low power consumption (e.g., around 0.1 to 0.2 Watts or less on average), and they can be relatively small and inexpensive. In some examples, an individual wireless-spectrum analysis device can be smaller than a typical personal computer or laptop computer, and can operate in a variety of environments. In some cases, the wireless-spectrum analysis devices are modular, portable, compact devices that can be installed in office spaces, on urban infrastructure, in residential areas, on vehicles, or other locations. In some cases, a wireless-spectrum analysis device can be manufactured for less than $100, although the actual cost will vary.

In the example shown in FIG. 1, the wireless-spectrum analysis devices 110 are geographically distributed more densely than the base stations 120. As such, in some instances, the wireless-spectrum analysis devices 110 can inspect the wireless-spectrum with higher location resolution and accuracy. As a particular example, a thousand wireless-spectrum analysis devices 110 may be placed in various locations within a city, with approximately fifty wireless-spectrum analysis devices 110 within each the area of each cell 105, although the actual number will vary for individual applications. Each wireless-spectrum analysis device 110 resides in a distinct location (i.e., a location that is physically distinguishable from the locations of the other wireless-spectrum analysis devices 110).

The density of the wireless-spectrum analysis devices 110 in a geographic area can be determined, for example, based on the area, population, location, or other factors of the geographic area. For instance, the density of the wireless-spectrum analysis devices 110 in an urban area may be higher than in a rural area, in some instances. In some cases, due to their relatively low cost and small size, the example wireless-spectrum analysis devices 110 can be distributed throughout a cell 105 or another region of interest to provide a more economic solution for monitoring and analyzing wireless-spectrum usage throughout the region.

The wireless-spectrum analysis system 100 can be implemented, in some cases, with a high level of flexibility in system configuration and management. For example, the wireless-spectrum analysis devices 110 can be portable, plug-and-play devices that can be relocated relatively easily, and can operate in a variety of locations. In some examples, the wireless-spectrum analysis devices 110 have standard communication interfaces (e.g., Ethernet, WiFi, USB, etc.) and accept standard power or operate on battery power. Accordingly, the configuration of the wireless-spectrum analysis system 100 (e.g., the total number, density, and relative locations of the wireless-spectrum analysis devices 110) can accommodate a variety of environments and can be modified or adjusted, for example, from time to time.

The example data aggregation system 115 can receive spectral usage information (including measurements, a digest of relevant information, etc.) sent from the wireless-spectrum analysis devices 110, store the spectral usage information (e.g., in a database), and execute algorithms that process the aggregated data from the database to extract higher-level information of the spectral usage. The higher-level information can include, for example, trends, statistics, coverage, network usage, or any other local or global information associated with the wireless-spectrum analysis devices 110. The data aggregation system 115 may also control operation of the wireless-spectrum analysis devices 110, and interact with them individually, for example, to provide software updates, to request particular data, or to perform other control operations.

Figure 2:
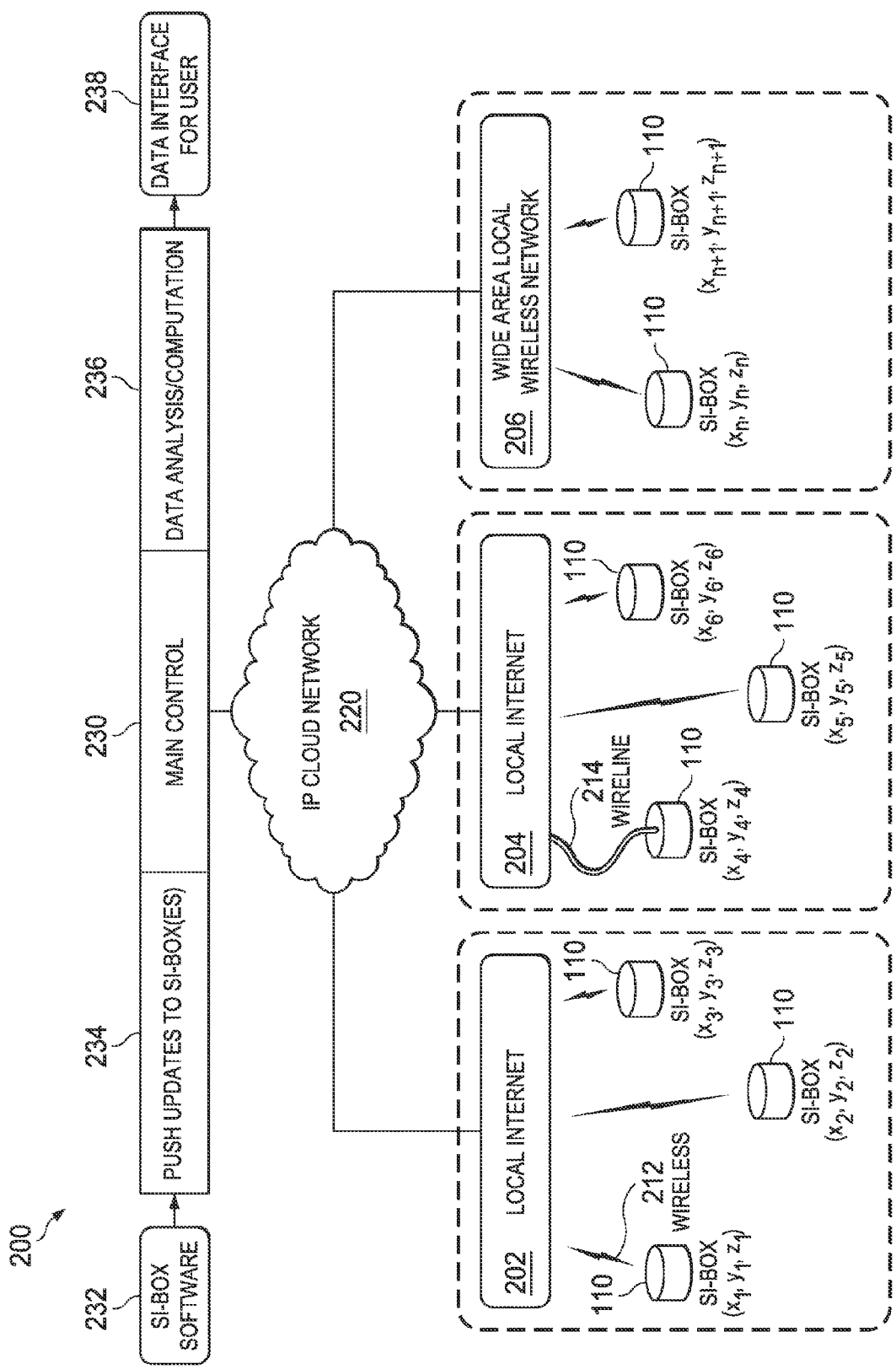
FIG. 2 is a block diagram showing architecture of an example wireless-spectrum analysis system.

FIG. 2 is a block diagram showing architecture of an example wireless-spectrum analysis system 200. The wireless-spectrum analysis system 200 can represent the wireless-spectrum analysis system 100 of FIG. 1, or another wireless-spectrum analysis system. The example wireless-spectrum analysis system 200 includes a number of wireless-spectrum analysis devices 110, an IP cloud network 220, and a main controller 230. The wireless-spectrum analysis system 200 can include additional or different components. In some implementations, a wireless-spectrum analysis system can be arranged as shown in FIG. 2 or in another suitable manner.

In the example shown in FIG. 2, each wireless-spectrum analysis device 110 is implemented as a spectrum inspection (SI) box at a respective physical location having spatial coordinates $(x_i, y_i, z_i)$, where i varies from 1 to L (L is the number of the wireless-spectrum analysis devices 110). In some implementations, each SI box can include a Global Positioning System (GPS) or another location identification system that identifies the location coordinates of the SI box, or the location coordinates can be identified in another manner. In some implementations, each SI box has a unique identifier, and the identifier can be associated with a location identifier or location coordinates.

The example SI boxes can monitor and analyze wireless-spectrum in both frequency and time domains and perform in-depth analyses of wireless communication services available at the associated geographic location. For instance, the SI box can detect an RF signal in a local wireless environment about the location of the SI box at any given time. In some instances, the SI box can identify data packets and frames, extract synchronization information, cells and services identifiers, and quality measurements of RF channels (e.g., channel quality indicator (CQI)), and the SI box can derive spectral-usage parameters based on these and other control information and traffic data of the RF signal detected by the SI box. The control information and traffic data of the RF signal can include physical and medium access (MAC) layers information corresponding to a wireless communication standard such as, 2G GSM/EDGE, 3G/CDMA/UMTS/TD-SCDMA, 4G/LTE/LTE-A, WiFi, Bluetooth, etc. The spectral-usage parameters (e.g., for particular frequencies, or particular bandwidths, etc.) can include the power of detected RF signals, the signal-to-noise ratio (SNR) of detected RF signals, the frequency at which detected RF signals have maximum power, or other parameters. In some implementations, the SI box can identify RF jammers and interferers, or other types of information.

In the example shown in FIG. 2, data from the SI boxes (e.g., the spectral-usage parameters or other information) are aggregated by a data aggregation or central control system (e.g., the main controller 230). In some implementations, data from the SI boxes are aggregated by the main controller 230 by receiving the messages transmitted from the SI boxes, for example, through the IP network (e.g., the IP cloud network 220). In some implementations, the SI boxes are connected to the IP cloud network 220 via a local network (e.g., a local internet 202 or 204). The SI boxes can be connected to the local network by a local wireline network 214 or a wireless network 212. The wireline network 214 can include, for example, Ethernet, xDSL (x-digital subscriber line), optical network, or other types of wireline communication networks. The wireless network 212 can include, for example, WiFi, Bluetooth, NFC, or other types of local wireless networks. In some implementations, some of the SI boxes are connected directly to the IP cloud network 220 using one or more wide area networks 206. The wide area networks 206 can include, for example, cellular network, satellite network, or other types of wide area networks.

The example main controller 230 can be included in the data aggregation system 115 of FIG. 1 or another back-end system. The main controller 230 can be a computing system that includes one or more computing devices or systems. The main controller 230 or any of its components can be located at a data processing center, a computing facility, or another location. In the example shown, the main controller 230 can remotely control operation of the SI boxes. Example functions of the main controller 230 can include aggregating the information from some or all of the SI boxes, upgrading the SI box software, monitoring states of the SI boxes, etc. For example, the main controller 230 can send software updates to some or all SI boxes.

In the example shown in FIG. 2, the main controller 230 can put the SI boxes into one or more calibration or test modes, reset various elements within the SI boxes, or configure any individual SI box as necessary, for example, based on the location or state of the SI box, its neighboring SI boxes, or other factors. In some examples, the states of an SI box can include: (i) the temperature of the SI box, (ii) the current power consumption of the SI box, (iii) the data rate flowing from the SI box back to the main controller 230, (iv) the signal strength, SSID's, or MAC addresses of the local WiFi signals around the SI box, (v) the location of the SI box (e.g., detected an internal GPS unit in the SI box), (vi) a signal (e.g., IP packets, control signaling transmitted over the network) that provides information on the state of the SI box or its surrounding SI boxes. The main controller 230 may monitor additional or different states of the SI boxes.

In some implementations, the main controller 230 can include or be coupled to a communication system that receives spectrum inspection information (e.g., spectral-usage parameters, spatial and temporal coordinates for each of the spectral-usage parameters, states of the SI boxes, etc.) transmitted from the SI boxes. The main controller 230 can include or be coupled to a data analysis system 236 that can aggregate (e.g., assemble, compile or otherwise manage) the spectrum inspection information from the multiple SI boxes and generate a spectral-usage report for the geographic region based on the spectral-usage parameters from the SI boxes.

Figure 3:
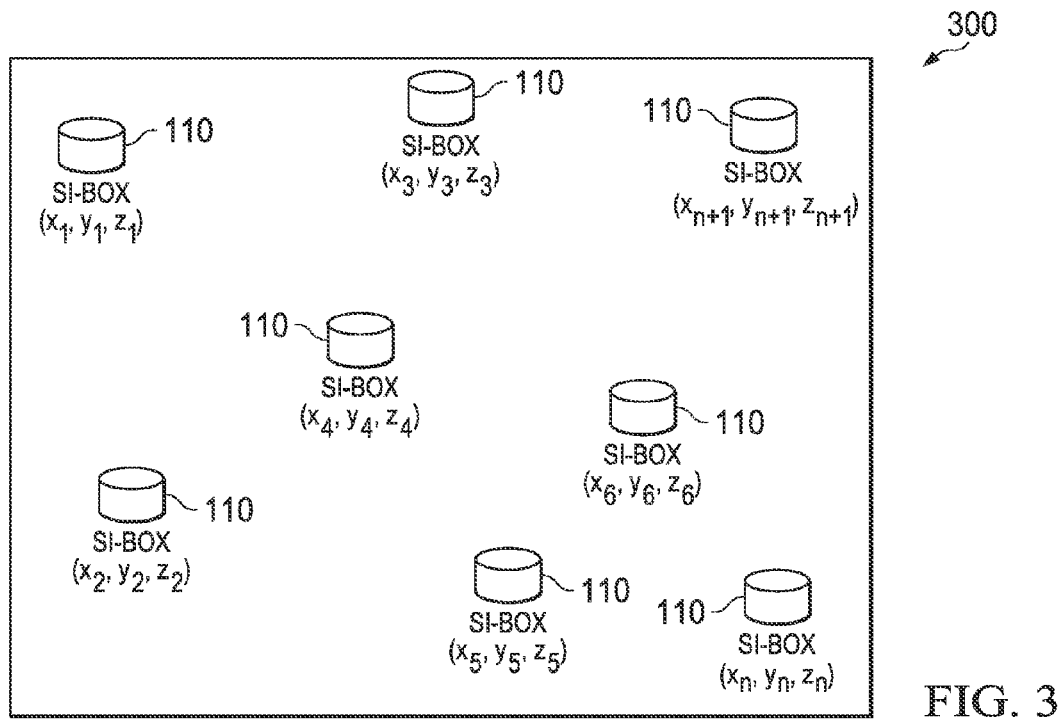
FIG. 3 is a block diagram showing an example distribution of wireless-spectrum analysis devices.
Figure 4:
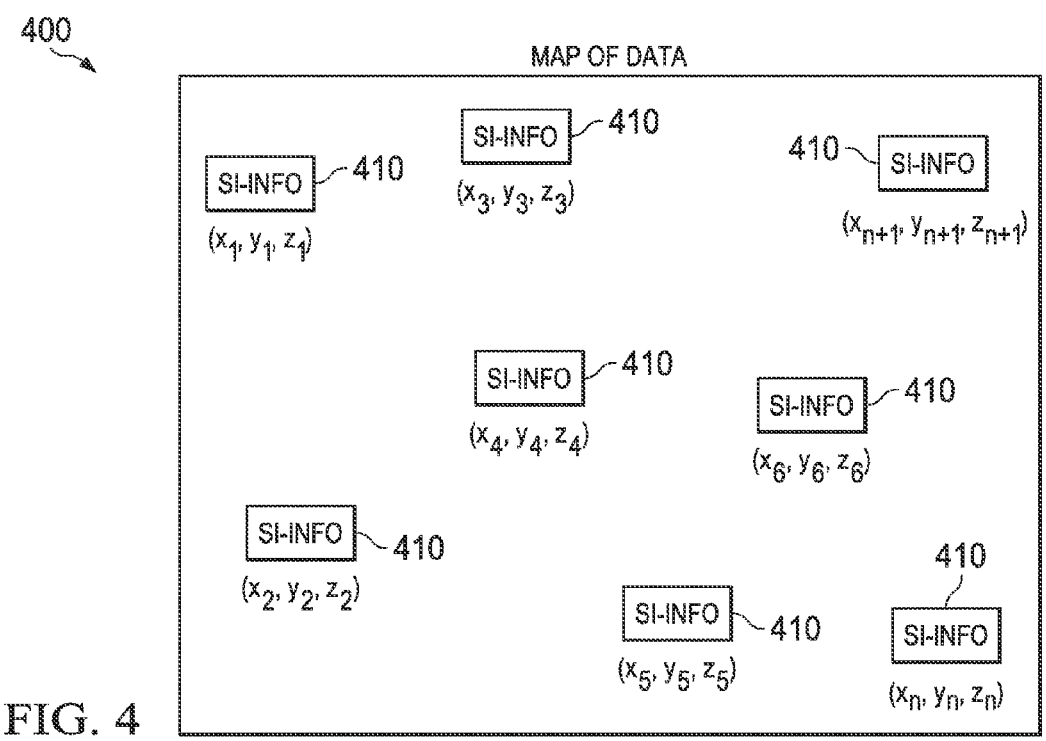
FIG. 4 is a block diagram showing example spectrum inspection (SI) information associated with wireless-spectrum analysis devices.
Figure 5:
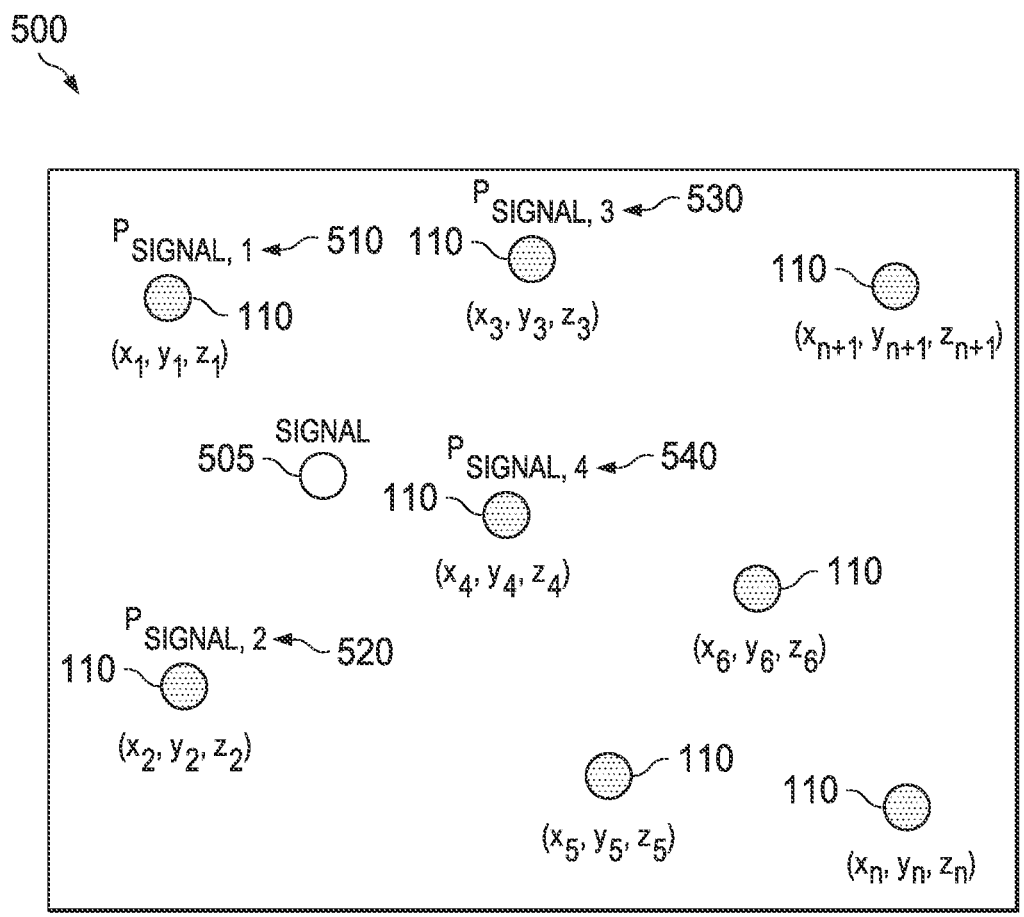
FIG. 5 is another block diagram showing example SI information associated with wireless-spectrum analysis devices.

In some instances, the spectral-usage report can be presented on a data interface 238 to present users the usage, quality, or other information of the wireless-spectrum over the various locations of the SI boxes. For example, the spectral-usage report can indicate detected wireless traffic levels in each of the multiple bandwidths in an RF spectrum, detected wireless traffic levels for multiple wireless communication standards, spatial and temporal distributions of wireless-spectrum usage in the geographic region, or other information. The traffic levels can include, for example, throughput, data rate, peak and valley values, or other statistics (e.g., average and variance) of the spectral usage information. The spectral-usage report can include, for example, tables, charts, and graphs showing the detected wireless traffic levels versus space and time. For instance, the spectral-usage report can include a graph or map (e.g., as shown in FIGS. 3-5) showing the spatial distribution of wireless-spectrum usage in the geographic region. The spectral-usage report can include a bar chart or table showing the temporal distribution or trends of wireless-spectrum usage (e.g., showing the peak, average, and valley traffic amount during a day, a month, or a year).

In some implementations, the data analysis system 236 can analyze real-time data, historical data, or a combination of both, and determine spectral-usage parameters for a geographic region. For example, the data analysis system 236 can determine a source location for the wireless signals received by the SI boxes; and the generated spectral-usage report can include an indication of the source location.

FIGS. 3 and 4 show aspects of example spatial and temporal distributions of wireless-spectrum usage in a geographic region; FIG. 5 shows aspects of example techniques for determining the source location. In some instances, similar or related information can be included in a spectral-usage report generated by the main controller 230 and displayed to the users. In some implementations, the spectral-usage report can include additional or different representations of the spectral-usage information.

FIG. 3 is a block diagram 300 showing an example spatial distribution of wireless-spectrum analysis devices (e.g., the SI boxes). As shown in FIG. 3, each SI box has a geographic location $(x_i, y_i, z_i)$ and can monitor and analyze the wireless-spectrum at its respective geographic location $(x_i, y_i, z_i)$. Each SI box can transmit spectrum inspection (SI) information to a data aggregation system (e.g., the main controller 230 in FIG. 2). The SI information can include, for example, spectrum data (e.g., spectral-usage parameters), location and time information for each spectral-usage parameter, state information of the SI box, or other information. For example, the location and time information can include spatial coordinates of the SI box (e.g., $(x_i, y_i, z_i)$ or in other coordinates) and temporal coordinates (e.g., a time of day) at which each of the spectral-usage parameters is obtained. The example block diagram 300 shows the spatial coordinates of the SI boxes and serves as a map of the example spatial distribution of the SI boxes in a geographic region. In some implementations, the SI information of each SI box can be superimposed onto the diagram 300 and displayed, for example, to a user.

FIG. 4 is block diagram 400 showing example SI information 410 associated with the SI boxes shown in FIG. 3. In the example shown in FIG. 4, the example SI information 410 can be displayed adjacent to or on top of the respective spatial coordinates of the SI boxes. The displayed SI information 410 can include some or all types of SI information described above. For example, one or more of the spectral-usage parameters can be displayed. In some implementations, temporal coordinates for each of the spectral-usage parameters can also be displayed. The information can be the same, similar, or different for each distinct SI box. Because the SI information 410 can be aggregated at a central location (e.g., the main controller 230), the SI information 410 of multiple SI boxes can be correlated, compared, interpolated, or otherwise manipulated to derive further information. For example, the relative position of a source signal can be determined based on SI information of the SI boxes that can detect the source signal. Additional or different information can be derived.

FIG. 5 is another block diagram 500 showing example SI information associated with the SI boxes shown in FIG. 3. In this example, a detected signal power at one or more frequencies is displayed as the example SI information for each SI box at its respective location. The measured power of the signal at frequency f at locations $(x_1, y_1, z_1)$, $(x_2, y_2, z_2)$ $(x_3, y_3, z_3)$, and $(x_4, y_4, z_4)$ are denoted as $P_{signal,1}$ 510, $P_{signal,3}$ 520, $P_{signal,2}$ 530, and $P_{signal,4}$ 540, respectively. Based on the measured power levels of the multiple SI boxes, the source location of the signal at frequency f 505 can be estimated, for example, automatically by a data analysis system (e.g., of the central controller). For example, the source location of the signal 505 can be determined based on the intersection of multiple arcs centered at the locations of the SI boxes, e.g., $(x_1, y_1, z_1)$, $(x_2, y_2, z_2)$, $(x_3, y_3, z_3)$, and $(x_4, y_4, z_4)$. The radius of each arc can be determined based on the $P_{signal,1}$ 510, $P_{signal,3}$ 520, $P_{signal,2}$ 530, and $P_{signal,4}$ 540, the respective path losses, shadowing effects, or other propagation conditions in the local wireless environment about each of the multiple SI boxes. Accordingly, the source location of the RF signals can be pinpointed and illustrated on the example map 500 for visualization.

Figure 6:
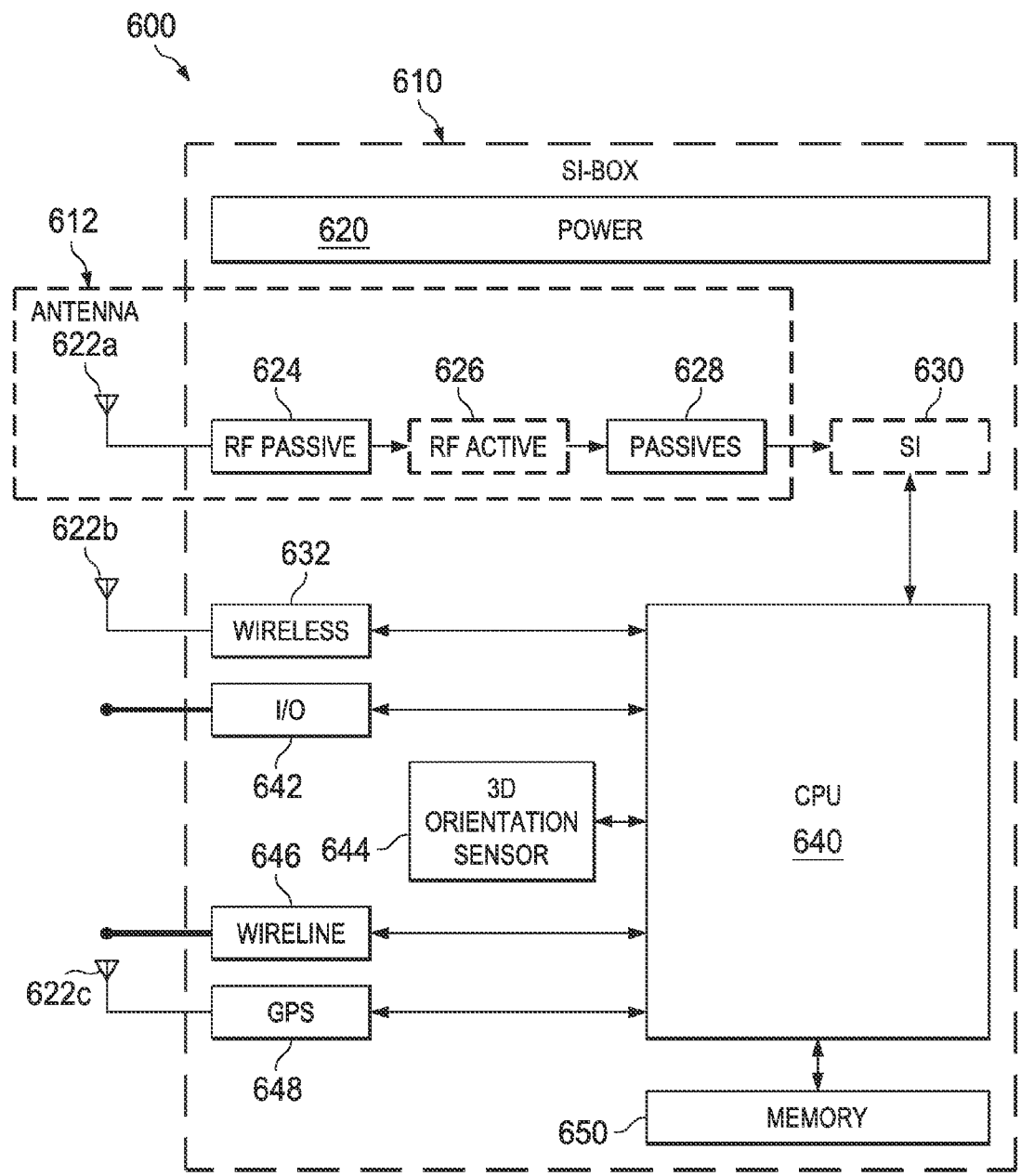
FIG. 6 is a block diagram showing an example wireless-spectrum analysis device.

FIG. 6 is a block diagram showing an example wireless-spectrum analysis device 600. In some cases, the SI boxes of FIGS. 1-5 can be implemented as the example wireless-spectrum analysis device 600 shown in FIG. 6 or as another type of wireless-spectrum analysis device. The example wireless-spectrum analysis device 600 includes a housing 610, an RF interface 612, a power management subsystem 620, a signal analysis subsystem (e.g., the SI subsystem 630, etc.), a CPU 640, a memory 650, communication interfaces, an input/output interface 642 (e.g., a USB connection), a GPS interface 648, and one or more sensors (e.g., 3D orientation sensors 644 such as a compass or gyroscope, temperature sensors, etc.). The wireless-spectrum analysis device 600 can include additional or different components and features, and the features of the wireless-spectrum analysis device can be arranged as shown in FIG. 6 or in another suitable configuration.

In some implementations, the housing 610 can be a portable housing that houses the RF interface 612, the power management subsystem 620, the signal analysis subsystem, the communication interfaces, and other components of the wireless-spectrum analysis device 600. The housing can be made of plastic, metal, composites, or a combination of these and other materials. The housing can include components that are manufactured by molding, machining, extruding, or other types of processes. In some implementations, the wireless-spectrum analysis device 600 can be coupled to or integrated with another device (e.g., a pico/femto cell box of a cellular system, a WiFi access point or base station, a vehicle, a router, a mobile device, a thermostat, etc.). For example, the housing 610 of the wireless-spectrum analysis device 600 can be attached to, incorporated, or otherwise coupled to the other device. Alternatively, the housing 610 can be a dedicated housing that houses only the components of the wireless-spectrum analysis device 600.

In some implementations, the design and arrangement of the housing 610 and components inside the housing 610 can be optimized or otherwise configured for monitoring and analyzing wireless-spectrum usage. For example, the sizes, orientations, and relative locations of the components can be optimized for detecting and analyzing RF signals, and the device can be compact while accommodating all the necessary components. In some instances, the housing 610 can be on the order of, for example, $10 \times 10 \times 4$ cm$^3$; or another size housing can be used.

In some implementations, the RF interface 612 is configured to detect RF signals in multiple bandwidths of an RF spectrum in a local wireless environment about the wireless-spectrum analysis device 600. The RF interface 612 can include an antenna system and multiple radio paths that are configured to process RF signals in the respective bandwidths. In the example shown in FIG. 6, the RF interface 612 includes an antenna 622a, RF passive elements 624, RF active elements 626, and passive elements 628. The RF passive elements 624 can include, for example, matching elements, RF switches, and filters. The RF active elements 626 can include, for example, RF amplifiers. The passive elements 628 after the RF active elements 626 can include, for example, filters, matching elements, switches, and baluns.

In some examples, the signal analysis subsystem can be configured to identify the spectral-usage parameters based on the RF signals. A signal analysis subsystem can include radio (s), digital signal processor (DSP), memory, and other components for extracting spectral parameters and for analyzing the RF spectrum. In some implementations, the combination of the RF interface 612 and the signal analysis subsystem can be referred to as a spectrum inspection (SI) signal path, which is described in greater detail with respect to FIG. 7.

The communication interfaces of the wireless-spectrum analysis device 600 can be configured to transmit the spectral-usage parameters or other SI information to a remote system (e.g., the main controller 230 of FIG. 2). The communication interfaces can include, one or more wireless interfaces 632 (e.g., a WiFi connection, cellular connection, etc.), a wireline interface 646 to a local network (e.g., an Ethernet connection, xDSL connection, etc.) or other types of communication links or channels. The communication interfaces can share and reuse the common antennas (e.g., using an antenna array) or they can each have distinct and dedicated antennas.

The wireless interface 632 and the wireline interface 646 can each include a modem to communicate with the local or wide area network. For example, the wireless interface 632 and the wireline interface 646 can send SI information to a data aggregation system (e.g., the main controller 230 of FIG. 2) and receive control information (e.g., software updates) from the data aggregation system, via the local or wide area network. In some implementations, a wireless-spectrum analysis device can be equipped with either or both of the communication interfaces. The wireline interface 646 can allow the example wireless-spectrum analysis device 600 to exploit existing wireline communication infrastructure (e.g., in a building) and large transmission capacity of wireline communications (e.g., large bandwidth provided by optical network, advanced digital subscriber line technologies, etc.). The wireless interface 632 can enhance the mobility and flexibility of the example wireless-spectrum analysis device 600 such that it can deliver SI information at a variety of locations and times, using Bluetooth, WiFi, cellular, satellite, or other wireless communication technologies.

In some implementations, the wireless interface 632 and the RF interface 612 can share hardware or software components (or both). In some implementations, the wireless interface 632 and the RF interface 612 can be implemented separately. In some implementations, the RF interface 612 is mainly responsible for signal reception rather than transmission, and the RF interface 612 can be implemented with specialized lower-power circuitry and thus reduce the overall power consumption of the wireless-spectrum analysis device 600.

The power management subsystem 620 can include circuits and software for providing and managing power to the wireless-spectrum analysis device 600. In some implementations, the power management subsystem 620 can include a battery interface and one or more batteries (e.g., rechargeable batteries, a smart battery with an embedded microprocessor, or a different type of internal power source). The battery interface may be coupled to a regulator, which may assist the battery in providing direct current electrical power to the wireless-spectrum analysis device 600. As such, the wireless-spectrum analysis device 600 can include a self-contained power supply and can be used at arbitrary locations without need for other external energy sources. Additionally or alternatively, the power management subsystem 620 can include an external power interface that receives power from an external source (e.g., an alternating current power source, an adapter, a converter, etc.). As such, the wireless-spectrum analysis device 600 can be plugged into an external energy source.

In some implementations, the power management subsystem 620 can oversee and manage power consumption of the wireless-spectrum analysis device 600. For example, the power management subsystem 620 can monitor the power consumption of the RF interface 612, communication interfaces, the CPU 640, and other components of the wireless-spectrum analysis device 600, and report the power consumption state of the wireless-spectrum analysis device 600, for example, to a central controller. In some implementations, the wireless-spectrum analysis device 600 can be designed to have low power consumption and the power management subsystem 620 can be configured to send an alert to the central controller or intervene with the operations of the wireless-spectrum analysis device 600 if the power consumption exceeds a threshold. The power management subsystem 620 can include additional or different features.

The CPU 640 can include one or more processors or another type of data-processing apparatus that can execute instructions, for example, to manage the operations of the wireless-spectrum analysis device 600. The CPU 640 may perform or manage one or more of the operations of a wireless-spectrum analysis device described with respect to FIGS. 1-5. In some implementations, the CPU 640 can be part of the SI subsystem 630. For example, the CPU 640 can process, compute, and otherwise analyze the measured wireless-spectrum data (e.g., from the RF interface 612). In some cases, the CPU 640 can execute or interpret software, scripts, programs, functions, executables, or other modules contained in the memory 650.

The input/output interface 642 can be coupled to input/output devices (e.g., a USB flash drive, a display, a keyboard, or other input/output devices). The input/output interface 642 can assist data transfer between the wireless-spectrum analysis device 600 and the external storage or display device, for example, over communication links such as a serial link, a parallel link, a wireless link (e.g., infrared, radio frequency, or others), or another type of link.

The memory 650 can include, for example, a random access memory (RAM), a storage device (e.g., a writable read-only memory (ROM) or others), a hard disk, or another type of storage medium. The memory 650 can store instructions (e.g., computer code) associated with operations of the wireless-spectrum analysis device 600, a main controller, and other components in a wireless-spectrum analysis system. The memory 650 can also store application data and data objects that can be interpreted by one or more applications or virtual machines running on the wireless-spectrum analysis device 600. The memory 650 can store, for example, location data, environment data, and state data of the wireless-spectrum analysis device 600, wireless-spectrum data, and other data.

In some implementations, the wireless-spectrum analysis device 600 can be programmed or updated (e.g., reprogrammed) by loading a program from another source (e.g., from a central controller through a data network, a CD-ROM, or another computer device in another manner). In some instances, the central controller pushes software updates to the wireless-spectrum analysis device 600 as the updates become available, according to a predetermined schedule, or in another manner.

Figure 7:
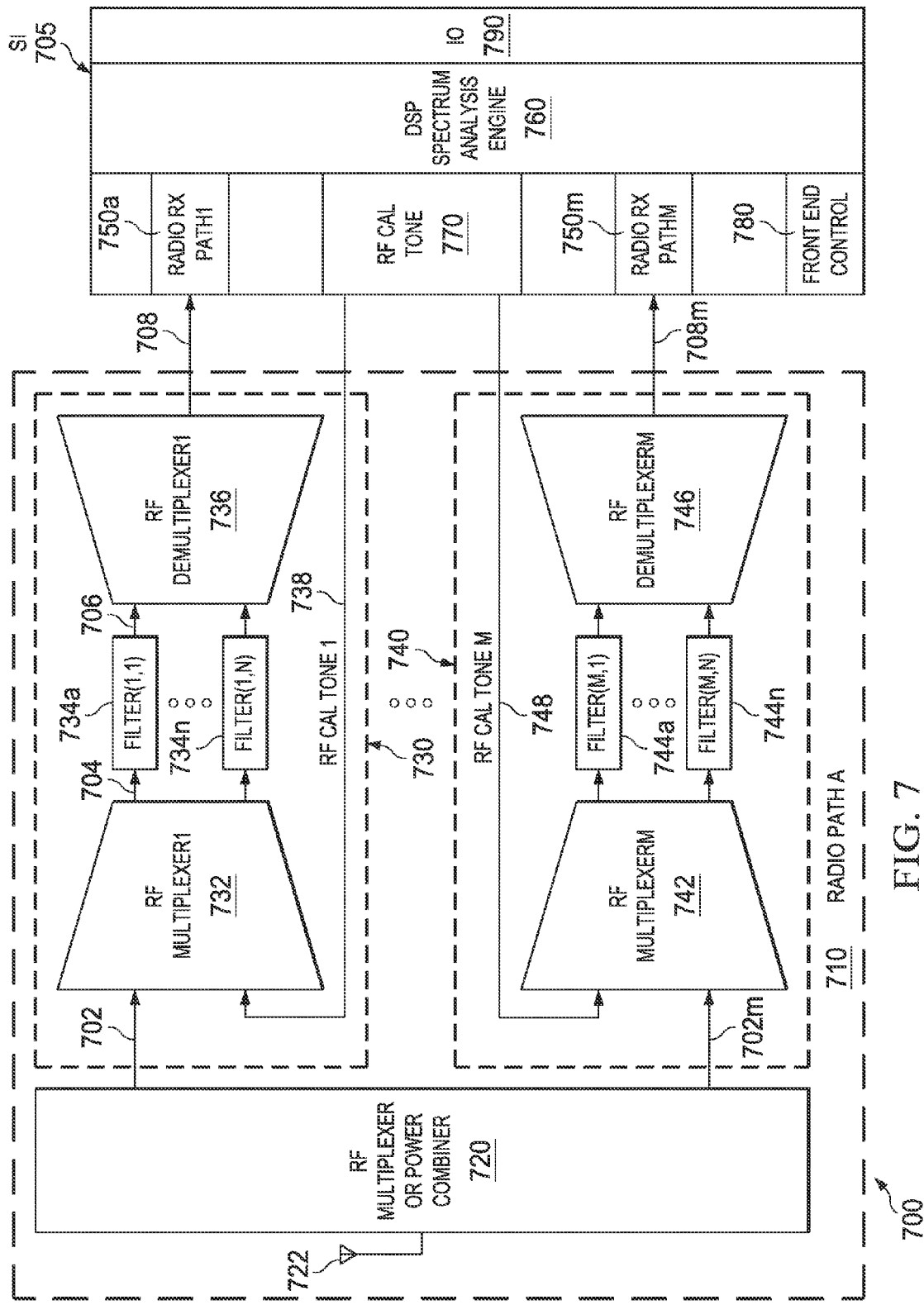
FIG. 7 is a block diagram showing an example SI signal path of a wireless-spectrum analysis device.

FIG. 7 is a block diagram showing an example spectrum inspection (SI) signal path 700. The SI signal path 700 includes an RF interface 710 (e.g., denoted as Radio Path A) and a spectrum analysis subsystem 705. The RF interface 612 of the wireless-spectrum analysis device 600 of FIG. 6 can be implemented as the example RF interface 710 in FIG. 7 or in another manner. The SI subsystem 630 of the wireless-spectrum analysis device 600 of FIG. 6 can be implemented as the example spectrum analysis subsystem 705 in FIG. 7 or in another manner. In some cases, the SI signal path 700 can perform all necessary operations for monitoring and analyzing the wireless-spectrum usage. For example, the SI signal path 700 can perform functions of a typical wireless receiver such as demodulation, equalization, channel decoding, etc. The SI signal path 700 can support signal reception of various wireless communication standards and access the spectrum analysis subsystem 705 for analyzing the wireless-spectrum usage.

In the example shown, the RF interface 710 can be a wideband or narrowband front-end chipset for detecting and processing RF signals. For example, the RF interface 710 can be configured to detect RF signals in a wide spectrum of one or more frequency bands, or a narrow spectrum within a specific frequency band of a wireless communication standard. In some implementations, an SI signal path 700 can include one or more RF interfaces 710 to cover the spectrum of interest. Example implementations of such an SI signal path are described with respect to FIG. 8.

In the example shown in FIG. 7, the RF interface 710 includes one or more antennas 722, an RF multiplexer 720 or power combiner (e.g., an RF switch), and one or more signal processing paths (e.g., "path 1" 730, . . . , "path M" 740). The antenna 722 could be a multi-port antenna or single-port antenna. The antenna 722 can include an omnidirectional antenna, a directional antenna, or a combination of one or more of each. The antenna 722 is connected to an RF multiplexer 720. In some implementations, the RF interface 710 can be configured to use the one or more antennas 722 for detecting the RF signals based on single-input single-output (SISO), single-input and multiple-output (SIMO), multiple-input and single-output (MISO) or multiple-input and multiple-output (MIMO) technologies.

In some implementations, an RF signal in the local environment of an SI box can be picked up by the antenna 722 and input into the RF multiplexer 720. Depending on the frequency of the RF signal that needs to be analyzed, the signal 702 output from the RF multiplexer 720 can be routed to one of the processing paths (i.e., "path 1" 730, . . . , "path M" 740). Here M is an integer. Each path can include a distinct frequency band. For example, "path 1" 730 may be used for RF signals between 1 GHz and 1.5 GHz, while "path M" may be used for RF signals between 5 GHz and 6 GHz. The multiple processing paths may have a respective central frequency and bandwidth. The bandwidths of the multiple processing paths can be the same or different. The frequency bands of two adjacent processing paths can be overlapping or disjointed. In some implementations, the frequency bands of the processing paths can be allocated or otherwise configured based on the assigned frequency bands of different wireless communication standards (e.g., GSM, LTE, WiFi, etc.). For example, it can be configured such that each processing path is responsible for detecting RF signals of a particular wireless communication standard. As an example, "path 1" 730 may be used for detecting LTE signals while the "path M" 740 may be used for detecting WiFi signals.

Each processing path (e.g., "processing path 1" 730, "processing path M" 740) can include one or more RF passive and RF active elements. For example, the processing path can include an RF multiplexer, one or more filters, an RF de-multiplexer, an RF amplifier, and other components. In some implementations, the signal 702 output from the RF multiplexer 720 can be applied to a multiplexer in a processing path (e.g., "RF multiplexer 1" 732, . . . , "RF multiplexer M" 742). For example, if "processing path 1" 730 is selected as the processing path for the signal 702, the signal 702 can be fed into "RF multiplexer 1" 732. The RF multiplexer can choose between the signal 702 coming from the first RF multiplexer 720 or the RF calibration (cal) tone 738 provided by the spectrum analysis subsystem 705. The output signal 704 of "RF multiplexer 1" 732 can go to one of the filters, Filter(1,1) 734a, . . . , Filter (1,N) 734n, where N is an integer. The filters further divide the frequency band of the processing path into a narrower band of interest. For example, "Filter(1,1)" 734a can be applied to the signal 704 to produce a filtered signal 706, and the filtered signal 706 can be applied to "RF de-multiplexer 1" 736. In some instances, the signal 706 can be amplified in the RF de-multiplexer. The amplified signal 708 can then be input into the spectrum analysis subsystem 705.

The spectrum analysis subsystem 705 can be configured to convert the detected RF signals into digital signals and perform digital signal processing to identify spectral-usage parameters for the RF spectrum based on the detected RF signals. The spectrum analysis subsystem 705 can include one or more SI radio receive (RX) paths (e.g., "SI radio RX path 1" 750a, "SI radio RX path M" 750m), a DSP spectrum analysis engine 760, an RF calibration (cal) tone generator 770, a front end control module 780, and an I/O 790. The spectrum analysis subsystem 705 may include additional or different components and features.

In the example shown, the amplified signal 708 is input into "SI radio RX path 1" 750a, which down-converts the signal 708 into a baseband signal and applies gain. The down-converted signal can then be digitalized via an analog-to-digital converter. The digitized signal can be input into the DSP spectrum analysis engine 760. The DSP spectrum analysis engine 760 can, for example, identify packets and frames included in the digital signal, read preambles, headers, or other control information embedded in the digital signal (e.g., based on specifications of a wireless communication standard), determine the signal power and SNR of the signal at one or more frequencies over a bandwidth, channel quality and capacity, traffic levels (e.g., data rate, retransmission rate, latency, packet drop rate, etc.), or other spectral-usage parameters. The output (e.g., the spectral-usage parameters) of the DSP spectrum analysis engine 760 can be applied and formatted to the I/O 790, for example, for transmission of the spectral-usage parameters to the data aggregation system via one or more communication interfaces of the wireless-spectrum analysis device.

The RF calibration (cal) tone generator 770 can generate RF calibration (cal) tones for diagnosing and calibration of the radio RX paths (e.g., "radio RX path 1" 750a, . . . "radio RX path M" 750m). The radio RX paths can be calibrated, for example, for linearity and bandwidth.

Figure 8:
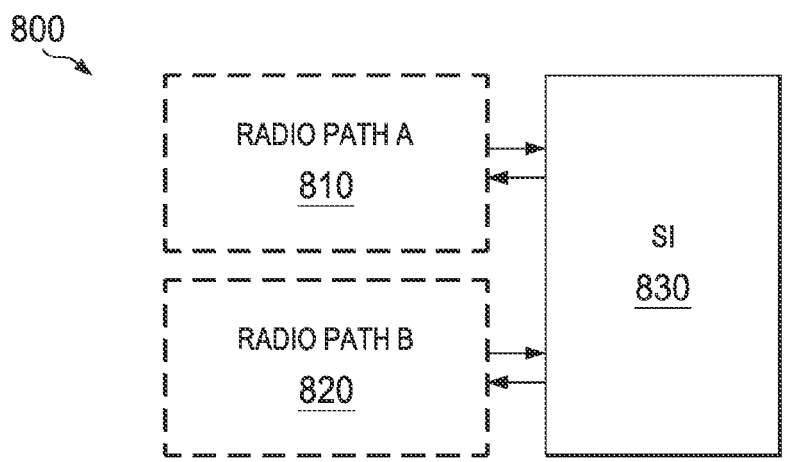
FIG. 8 is a block diagram showing another example SI signal path of a wireless-spectrum analysis device.

FIG. 8 is a block diagram 800 showing another example implementation of an SI signal path 800 of a wireless-spectrum analysis device. In some instances, the SI signal path can include more than one RF interfaces (radio paths) that are connected to multiple different antennas. In the example shown in FIG. 8, the SI signal path 800 includes a radio path A 810 and a radio path B 820, each coupled to a spectrum analysis subsystem 830. The radio path A 810 and radio path B 820 can be configured in a similar manner as the RF interface or radio path A 710 of FIG. 7, or they can be configured in another manner. The radio path A 810 and radio path B 820 can have the same or different configuration, for example, covering the same or different frequency bands for wireless-spectrum monitoring and analysis.

Figure 9:
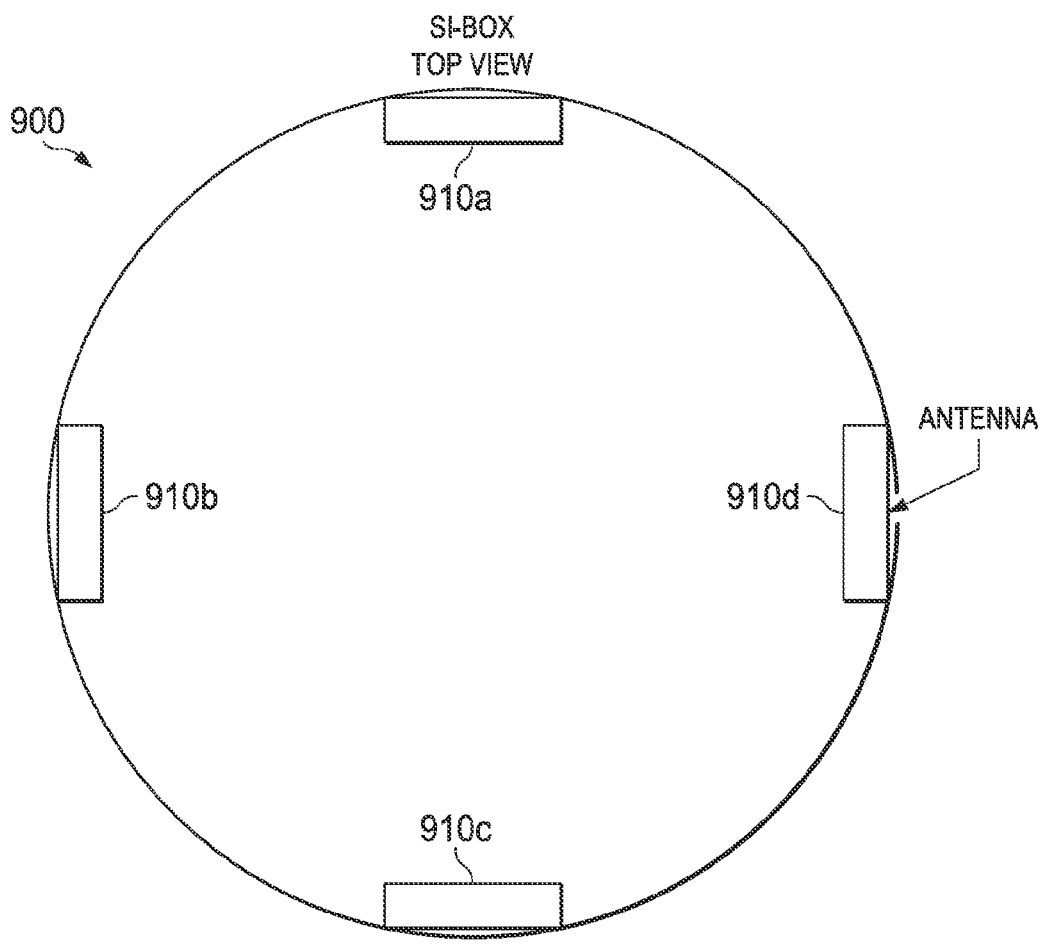
FIG. 9 is a top view of an example wireless-spectrum analysis device.

FIG. 9 is a top view of an example wireless-spectrum analysis device 900. In some cases, the SI boxes of FIGS. 1-5 can be implemented as the example wireless-spectrum analysis device 900 shown in FIG. 9 or as another type of wireless-spectrum analysis device. The example wireless-spectrum analysis device 900 in FIG. 9 can include some or all of the features shown in FIGS. 6-7, or the wireless-spectrum analysis device 900 in FIG. 9 can include fewer, additional or different features. The wireless-spectrum analysis device 900 can include one or more antennas, for example, connected to one or more RF interfaces inside a housing of the wireless-spectrum analysis device 900. For instance, the antennas of the example wireless-spectrum analysis device 900 can be the antennas 622a-c of FIG. 6 or the antenna 722 of FIG. 7.

The antennas can be strategically arranged on the wireless-spectrum analysis device 900 for reception of RF signals. The example wireless-spectrum analysis device 900 shown in FIG. 9 includes four antennas 910a-d placed ninety degrees from each other relative to the center of the wireless-spectrum analysis device 900. In some instances, the antennas can be arranged with a different degree of separation, orientation, or position, for example, based on the total number of antennas, the antenna profiles, the location and orientation of the wireless-spectrum analysis device 900, or other factors.

Figure 10:
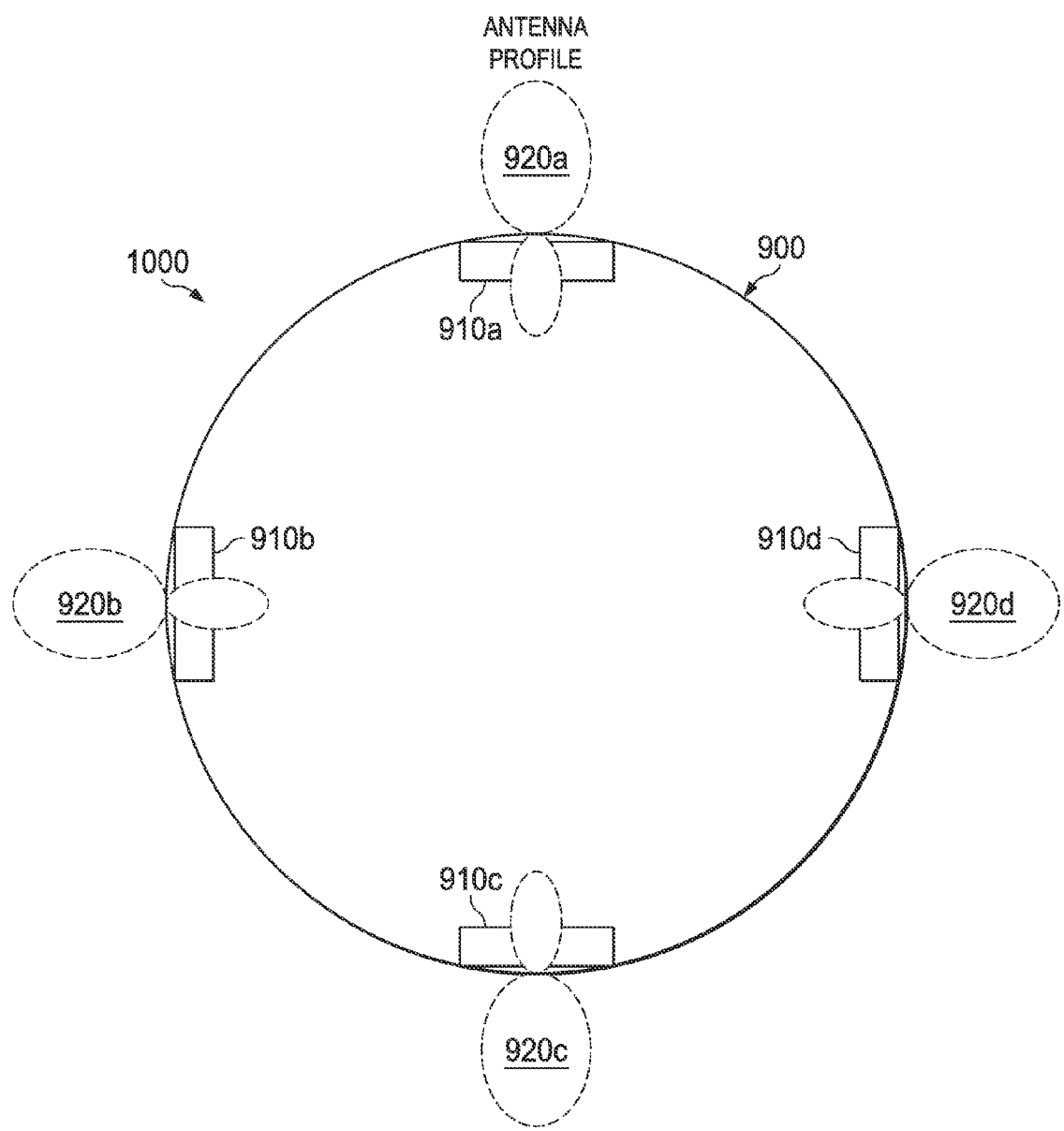
FIG. 10 is a top view of example antenna profiles of the antennas 910*a-d* of the example wireless-spectrum analysis device 900 of FIG. 9.

FIG. 10 is a top view 1000 of example antenna profiles of the antennas 910a-d of the example wireless-spectrum analysis device 900 of FIG. 9. In the example shown in FIG. 10, the antennas 910a-d have respective antenna profiles or patterns 920a-d, respectively. The antenna profiles 920a-d can be the same or different. The antenna profiles 920a-d can be selected or otherwise configured, for example, based on the frequency or frequency band of interest, the desired antenna gain, or other factors.

Figure 11:
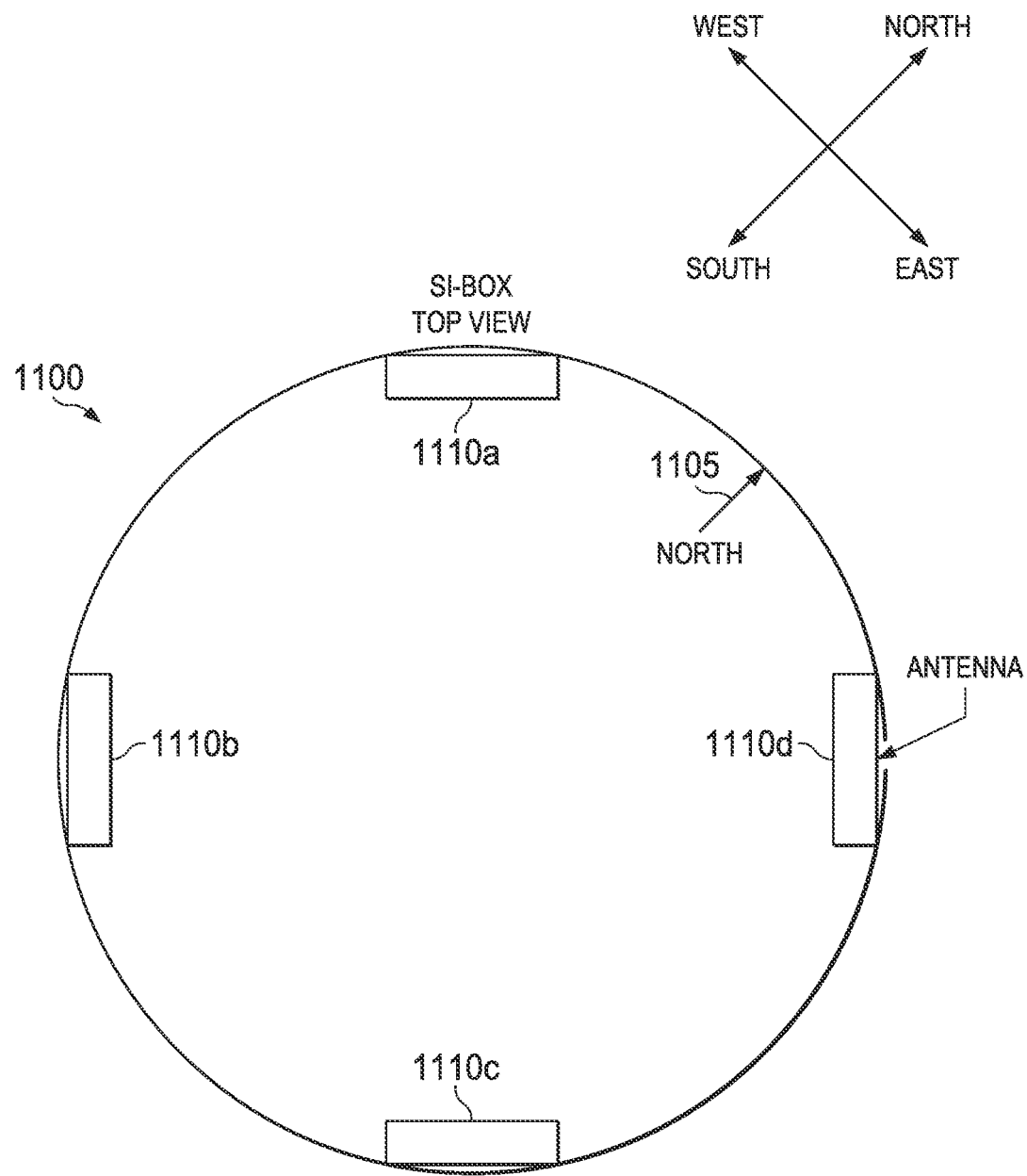
FIG. 11 is a top view of another example wireless-spectrum analysis device.

FIG. 11 is a top view of another example wireless-spectrum analysis device 1100. In some cases, the SI boxes of FIGS. 1-5 can be implemented as the example wireless-spectrum analysis device 1100 shown in FIG. 11 or as another type of wireless-spectrum analysis device. The example wireless-spectrum analysis device 1100 in FIG. 11 can include some or all of the features shown in FIGS. 6-10, or the wireless-spectrum analysis device 1100 in FIG. 11 can include fewer, additional or different features.

The wireless-spectrum analysis device 1100 includes four antennas 1110a-d and a reference direction indicator 1105 on the wireless-spectrum analysis device 1100. In some cases, the antennas 1110a-d are oriented or configured with respect to cardinal directions or another coordinate system according to the reference direction indicator 1105. In the example shown in FIG. 11, the reference direction indicator 1105 is oriented along the North compass direction. Another reference direction can be used. The orientations and displacements of the antennas 1110a-d can be identified and, in some cases, adjusted with respect to the reference direction indicator 1105.

In some implementations, a wireless-spectrum analysis device can be a portable, modular device. For example, some wireless-spectrum analysis devices can be moveable or reconfigurable for use in multiple locations (e.g., in series), without having to substantially deconstruct or disassemble the device. In some cases, wireless-spectrum analysis devices are interchangeable with each other, so that the network of wireless-spectrum analysis devices can be conveniently upgraded, expanded, tailored, or otherwise modified.

In some cases, a wireless-spectrum analysis device can be installed by one or more operators, for example, by positioning the device and connecting it to standard power and data links. In some cases, a wireless-spectrum analysis device can be secured in place by fasteners (e.g., screws, bolts, latches, adhesive, etc.), or a wireless-spectrum analysis device can rest in a free position (e.g., without fasteners). In some instances, wireless-spectrum analysis devices can operate in a variety of locations and environments. As an example, some wireless-spectrum analysis devices can be installed a vehicle (e.g., a car, a bus, a train, a ship, etc.) where the wireless-spectrum analysis device can monitor and analyze the spectrum while in motion. In other examples, wireless-spectrum analysis devices can be installed on traffic infrastructure, communication infrastructure, power infrastructure, dedicated real property, industrial systems, urban or commercial buildings, residential areas, and other types of locations.

Figure 12:
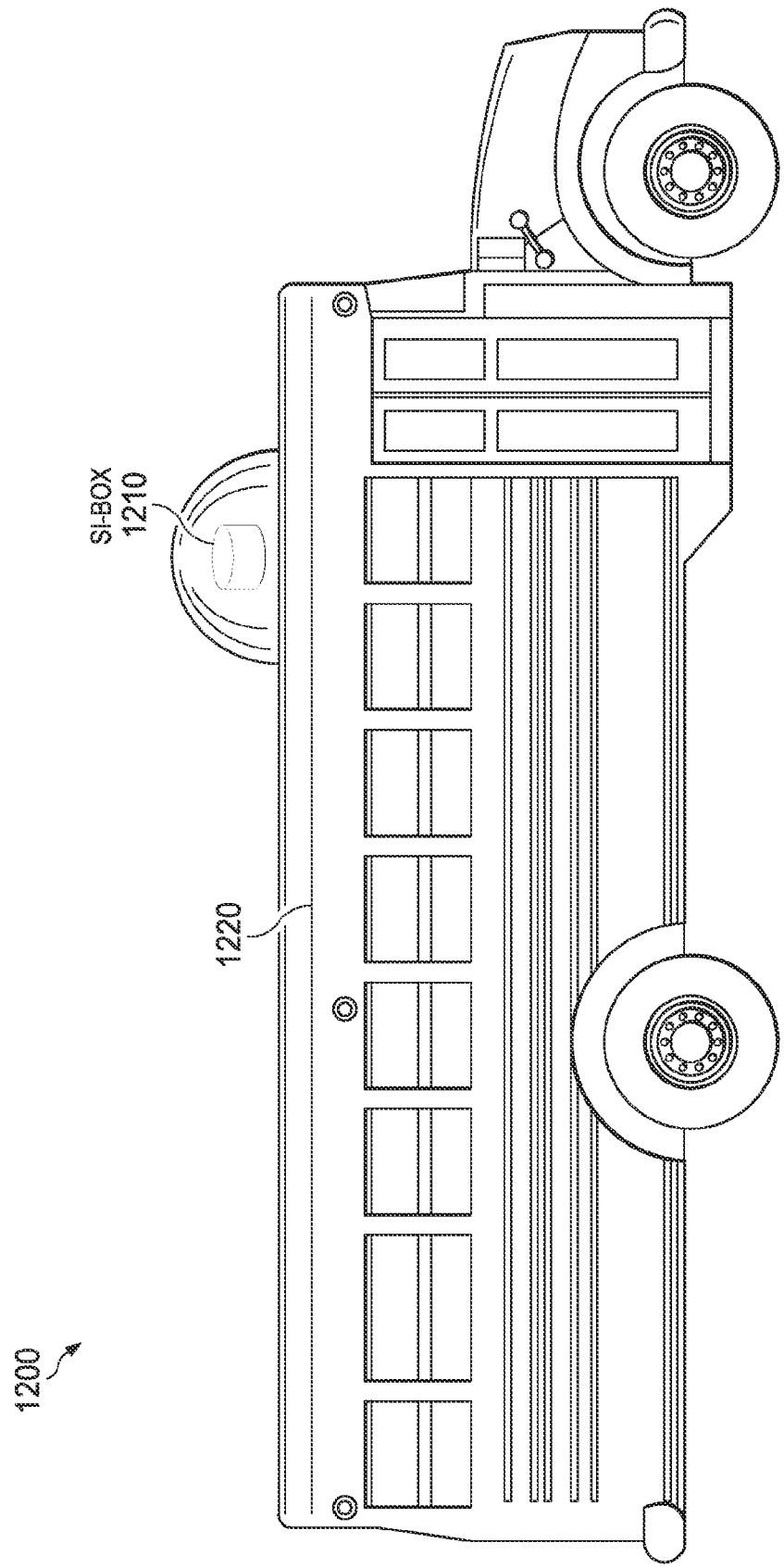
FIG. 12 is a block diagram showing an example application of a wireless-spectrum analysis device.

FIG. 12 is a block diagram 1200 showing an example application of a wireless-spectrum analysis device 1210 where the wireless-spectrum analysis device 1210 is mounted on a bus 1220. The wireless-spectrum analysis device 1210 can record its varying geographic locations, monitor the spectrum-usage data at each location, and transmit the spectrum inspection information to a central controller as the bus 1220 moves. In some implementations, the wireless-spectrum analysis device 1210 can be configured to monitor and analyze the spectrum used by passengers on the bus 1220. For example, the wireless-spectrum analysis device 1210 may detect identifiers of cellphones used by the passengers, detect cellular or WiFi signals transmitted and received by the cellphones of the passengers, and derive spectral-usage parameters specific to the RF traffic occurring within or around the bus 1220. The wireless-spectrum analysis device 1210 can be configured in another manner. In some cases, the wireless-spectrum analysis device 1210 can leverage power and communication capabilities of the bus 1220, or the wireless-spectrum analysis device 1210 can include independent power and communications capabilities.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other embodiments are within the scope of the following claims.

The invention claimed is:

1. A wireless-spectrum analysis system comprising:
wireless-spectrum analysis devices distributed at distinct locations over a geographic region, the wireless-spectrum analysis devices configured to concurrently monitor wireless-spectrum usage at each distinct location;
each wireless-spectrum analysis device comprising:
a radio-frequency (RF) interface configured to detect, in a local wireless environment about the wireless-spectrum analysis device, RF signals in multiple distinct bandwidths of an RF spectrum;
a signal analysis subsystem configured to generate spectral-usage parameters based on processing the RF signals, the processing comprising identifying a power of the RF signals detected in one or more of the bandwidths; and a communication interface configured to transmit messages comprising the spectral-usage parameters generated by the signal analysis subsystem, the messages indicating location information and time information for the spectral-usage parameters;

a data aggregation system configured to aggregate the spectral-usage parameters transmitted from the wireless-spectrum analysis devices.

2. The wireless-spectrum analysis system of claim 1, wherein each wireless-spectrum analysis device is a portable device dedicated to monitoring wireless-spectrum usage.

3. The wireless-spectrum analysis system of claim 1, wherein the RF interface comprises an antenna system and a plurality of radio paths, the radio paths configured to process RF signals in the respective bandwidths.

4. The wireless-spectrum analysis system of claim 1, wherein each wireless-spectrum analysis device comprises a dedicated housing that houses the RF interface, the signal analysis subsystem, and the communication interface.

5. The wireless-spectrum analysis system of claim 4, wherein the housing houses a power supply that powers the RF interface, the signal analysis subsystem, and the communication interface.

6. The wireless-spectrum analysis system of claim 1, wherein the wireless-spectrum analysis device is integrated with another device.

7. The wireless-spectrum analysis system of claim 1, wherein the signal analysis subsystem is configured to identify spectral-usage parameters comprising at least one of:
a power of detected RF signals in each bandwidth;
a power of detected RF signals at one or more frequencies;
a signal-to-noise ratio of detected RF signals at one or more frequencies; and
a frequency at which detected RF signals have maximum power in each bandwidth.

8. The wireless-spectrum analysis system of claim 1, wherein the signal analysis subsystem is configured to extract signaling information from the RF signals, and one or more of the spectral-usage parameters is based on the signaling information.

9. The wireless-spectrum analysis system of claim 1, wherein the data aggregation system is configured to generate a spectral-usage report for the geographic region based on the spectral-usage parameters from the wireless-spectrum analysis devices.

10. The wireless-spectrum analysis system of claim 1, wherein the data aggregation system comprises a central control system configured to remotely control operation of the wireless-spectrum analysis devices.

11. The wireless-spectrum analysis system of claim 1, wherein the communication interface is configured to transmit processed data without transmitting the RF signals from which the processed data are generated.

12. The wireless-spectrum analysis system of claim 1, wherein the location information comprises at least one of an identifier associated with a wireless-spectrum analysis device, a location identifier or location coordinates.

13. A method of analyzing wireless-spectrum usage in a geographic region, the method comprising:
monitoring wireless-spectrum usage concurrently at multiple distinct locations in a geographic region by operation of modular wireless-spectrum analysis devices distributed over the geographic region, each wireless-spectrum analysis device comprising a radio-frequency (RF) interface, a signal analysis subsystem, and a communication interface, each radio-frequency (RF) interface configured to detect, in a local wireless environment about the wireless-spectrum analysis device, RF signals in multiple distinct bandwidths of an RF spectrum;

generating spectral-usage parameters at each wireless-spectrum analysis device by operation of the respective signal analysis subsystems, the spectral-usage parameters generated based on a power of the RF signals detected in one or more of the bandwidths;

transmitting messages from the wireless-spectrum analysis devices by operation of the respective communication interfaces, the messages transmitted by each wireless-spectrum analysis device comprising the spectral-usage parameters generated by the signal analysis subsystem of the respective wireless-spectrum analysis device, the messages indicating location information and time information for the spectral-usage parameters; and aggregating, on a computing system, the spectral-usage parameters transmitted from the wireless-spectrum analysis devices.

14. The method of claim 13, wherein each wireless-spectrum analysis device monitors wireless-spectrum usage for multiple wireless communication standards.

15. The method of claim 13, wherein each wireless-spectrum analysis device transmits data that indicate the spectral-usage parameters and temporal and spatial coordinates associated with the spectral-usage parameters.

16. The method of claim 13, wherein each wireless-spectrum analysis device identifies spectral-usage parameters comprising at least one of:
a power of detected signals in each of multiple distinct bandwidths;
a power of detected signals at one or more frequencies;
a signal-to-noise ratio of detected signals at one or more frequencies; and
a frequency at which detected signals have maximum power in each of multiple distinct bandwidths.

17. The method of claim 13, further comprising generating a spectral-usage report for the geographic region based on the aggregated spectral-usage parameters from the wireless-spectrum analysis devices.

18. A wireless-spectrum analysis system comprising:
a communication system configured to receive spectral-usage parameters from wireless-spectrum analysis devices distributed over a geographic region, each wireless-spectrum analysis device comprising:
a radio-frequency (RF) interface configured to detect, in a local wireless environment about the wireless-spectrum analysis device, RF signals in multiple distinct bandwidths of an RF spectrum;
a signal analysis subsystem configured to generate spectral-usage parameters based on processing the RF signals, the processing comprising identifying a power of the RF signals detected in one or more of the bandwidths; and
a communication interface configured to transmit messages comprising the spectral-usage parameters from the wireless-spectrum analysis device, the messages indicating location information and time information for the spectral-usage parameters; and
a data analysis system that generates a spectral-usage report for the geographic region based on the spectral-usage parameters from the devices.

19. The wireless-spectrum analysis system of claim 18, wherein the spectral-usage report indicates detected wireless traffic levels in each of multiple bandwidths in a radio-frequency spectrum.

20. The wireless-spectrum analysis system of claim 18, wherein the communication system receives spatial and temporal coordinates for each of the spectral-usage parameters, and the spectral-usage report indicates spatial and temporal distributions of wireless-spectrum usage in the geographic region.

21. The wireless-spectrum analysis system of claim 18, wherein the spectral-usage report indicates detected wireless traffic levels for multiple wireless communication standards.

22. The wireless-spectrum analysis system of claim 18, wherein the data analysis system is configured to determine a source location for the detected RF signals, and the spectral-usage report indicates the source location.

\* \* \* \* \*